No. 766,104. Patented July 26, 1904.

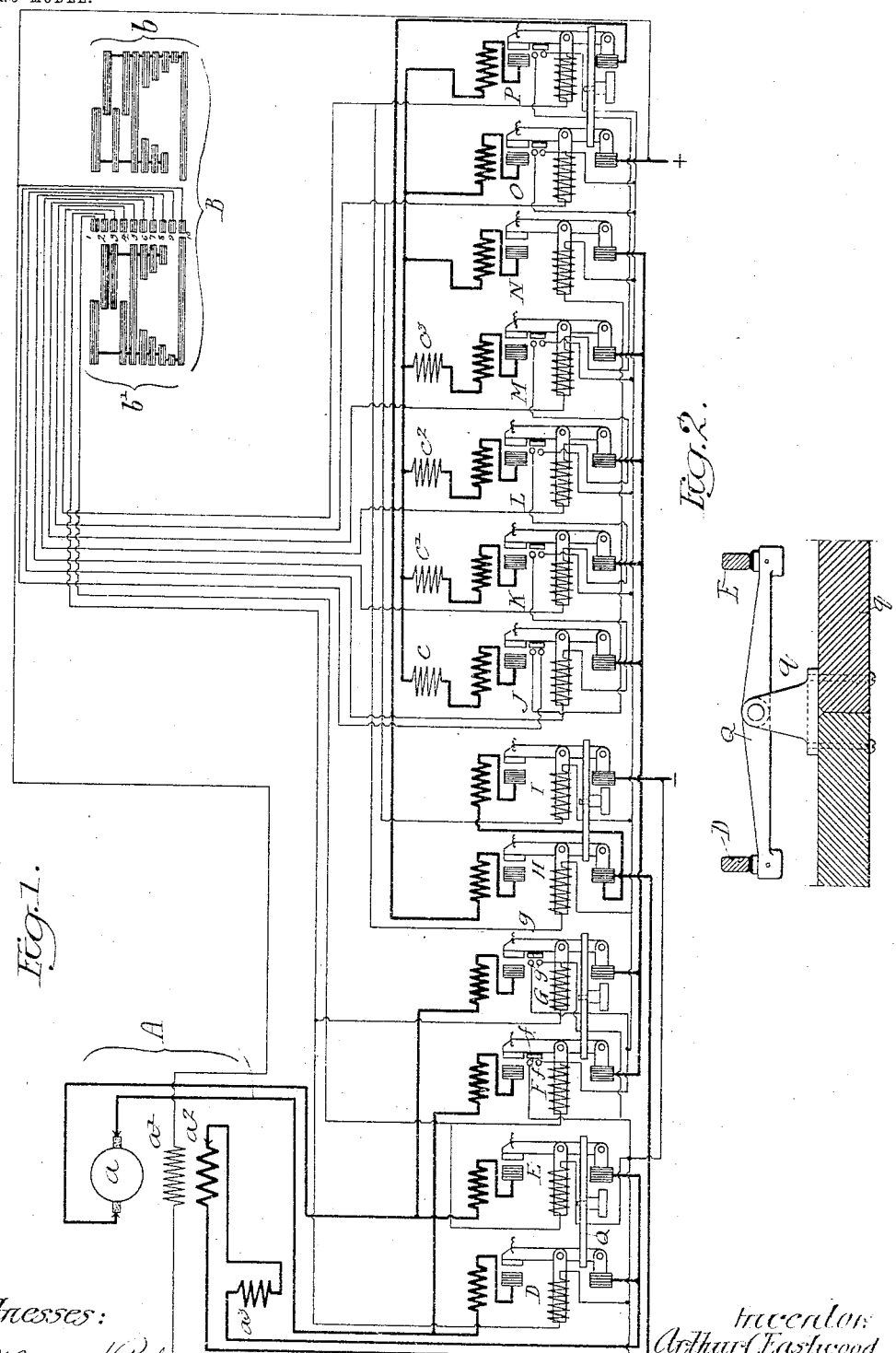

UNITED STATES PATENT OFFICE.

ARTHUR C. EASTWOOD, OF CLEVELAND, OHIO.

SYSTEM OF MOTOR CONTROL.

SPECIFICATION forming part of Letters Patent No. 766,104, dated July 26, 1904.

Application filed April 19, 1904. Serial No. 203,881. (No model.)

*To all whom it may concern:*

Be it known that I, ARTHUR C. EASTWOOD, a citizen of the United States, residing in Cleveland, Ohio, have invented certain Improvements in Systems of Motor Control, of which the following is a specification.

The object of my invention is to provide a novel combination of apparatus which will permit the speed of a motor, as well as its reversal and the braking force applied to it and its load for both directions of operation, to be governed by a controller having a single operating-lever.

It is further desired to provide a system for controlling the operation of an electric motor which shall be both simple as to the connection and arrangement of its parts and of such a nature as to be particularly adapted to the rapid operation of high-speed apparatus.

An additional object of my invention is to provide a controlling system in which will be combined the means for governing the speed of a motor when current is applied thereto and also means for applying a variable braking force to said motor after the current-supply is cut off.

It is further desired to provide a system in which the energy stored up in the armature of the motor and its attached moving parts due to their motion shall be absorbed and dissipated with practically no wear or depreciation of the apparatus employed, it being also desired that the energy liberated in lowering a load under the action of gravity shall be absorbed and dissipated without the use of mechanical brakes.

These objects I attain as hereinafter set forth, reference being had to the accompanying drawings, in which—

Figure 1 is a diagrammatic view showing the preferred arrangement and connections of the apparatus comprising my system of control; and Fig. 2 is a sectional plan view of portions of two switch-blades and their supporting structure, showing my preferred device for permitting but one of said two switches to be closed at the same time.

In the past electrical motors for driving cranes, conveying bridges, and similar machinery have been almost universally controlled by manually-operated controllers so designed that all of the main circuit connections for starting the motor and cutting in and out resistance have been effected by hand. The motors have in general been provided with electromagnetic brakes released by the flow of current through a magnetizing-coil and applied by a weight or spring, the connections of the coil being usually so arranged that when current is cut off from the motor the brake is automatically applied.

Of late years the speed and power of the above-mentioned class of machinery have been so far increased that motors of from one-hundred to three-hundred horse power are very frequently employed, such motors being governed by manually-operated controllers. These latter are necessarily of very large size and require great physical effort for their operation, particularly when it is desired to secure a high speed of operation of the machinery actuated from the driving-motor. As a consequence, the operator is frequently overworked, so that in many cases the output of the machinery is limited by his physical endurance in manipulating the controller.

The heavy conductors for transmitting current between the controller and the motor become under ordinary conditions an item of considerable expense, particularly if there is relative motion between the operator and the motor under his control, which necessitates carrying the current through sliding or rolling connections. Further, each time the motor is brought up to speed an amount of energy is stored in the armature and other moving parts of the system, which energy must be absorbed and dissipated each time the motor is brought to rest. When the machines operated are of large size and operated at frequent intervals there is consequently considerable heating, as well as rapid wear and depreciation of the brakes, thus necessitating the expenditure of much time and labor for their adjustment and their repair. Again, since no practical way has hitherto been devised for controlling the braking force of a solenoid-brake and as such brake must be adjusted to hold a load after it has stopped the same the motor and apparatus connected thereto are usually brought to rest with a jerk, producing what may be injurious strains. In some instances it has been customary to employ worm-gears for controlling the lowering of a load, which gears are of such a pitch that they must be driven in order to permit the load to descend.

The energy delivered by the lowering of a load must necessarily be absorbed by the worm-gearing, and as the efficiency of this latter is the same both in hoisting and in lowering a large amount of power is consequently required to hoist said load. It will therefore be seen that this arrangement of apparatus is exceedingly wasteful of power. Mechanical brakes, in connection with spur-gear drives, have also been employed for governing the descent of a load; but, as above pointed out in connection with solenoid-brakes, the wear and heating due to the large amounts of energy handled as well as to the high speed of operation produce very rapid depreciation of such brakes.

By my invention I employ magnetically-operated switches for effecting all of the necessary connections for stopping, starting, and reversing the motor as well as for cutting in and out the resistance used in controlling the speed of the motor. Not only are said switches and controlling resistance placed adjacent to the motor, so as to do away with long conductors of large size, but the operating-controller is constructed to carry only sufficient current to energize the magnetizing-coils of the various switches, its wiring connections being therefore of small size. Further, the controller itself may be made relatively small and compact and can be operated with the greatest ease.

I further provide switches and connections, as well as contacts on the operating-controller for energizing the coils of said switches, by means of which when the motor is disconnected from its normal source of current the electrical apparatus of the system may be reconnected in a closed circuit independent of said sources, so that the motor will operate as a generator. I also provide means whereby the resistance in circuit when the motor is operating as a generator may be varied at will to vary the current delivered, and consequently the braking force exerted upon the motor-armature and the machinery driving the same. For this purpose I prefer to use either the whole or a part of the ordinary controlling resistance of the motor, which, being preferably formed of cast-metal grids, will absorb and convert the energy of the moving machinery into heat with practically no wear or depreciation. In securing this last-described action I preferably use certain of the magnetically-operated switches normally employed for reversing and controlling the speed of the motor to effect the braking of the motor, as well as to control the amount of such braking, it being consequently seen that the addition of the braking attachment to the apparatus of my system adds but little to the cost of the same.

In order to hold a load when the motor is out of operation, I preferably employ a solenoid-brake so connected that while normally it takes no part in retarding the armature or the machinery connected thereto it immediately becomes effective for holding motionless said parts as soon as current no longer flows to or from the motor.

In the above drawings, A represents a compound-wound motor having an armature $a$, with a shunt field-winding $a'$ and a series field-winding $a^2$ $a^3$, being the coil of a solenoid-brake connected in series with said series winding. B is the operating-controller, which is shown in the drawings with its revoluble cylinder as developed.

There are in the present instance ten contact-fingers 1 to 10, inclusive, upon this controller and two sets of contact-segments $b'$ and $b$ upon the cylinder coacting therewith, it being noted that all of the segments of each set are respectively in electrical connection with each other. In the off position of the controller the fingers are between and out of contact with the segments of the two sets. $c$, $c'$, $c^2$, and $c^3$ are banks of resistance, preferably in the form of grids of cast metal, connected, respectively, to four switches and to each other, as shown.

In the present instance I preferably employ thirteen magnetically-operated switches, (designated by the letters D to P, inclusive,) each provided with a magnet-coil whose energization closes the switch.

It will be seen that the switches D and E, F and G, H and I, and O and P have extending between their blades a pivotally-mounted locking-bar Q, preferably of the construction shown in Fig. 2. This bar is placed so that its ends extend under the blades of two adjacent switches—as D and E, for example—being supported upon a standard $q$, suitably held to the switchboard $q'$ and insulated from said blades in any desired manner. Said bar is held at such a height that when one of the switch-blades is moved under the action of its magnet, so as to form electrical connection between its respective terminals, the blade of the other switch engaged by the bar is necessarily moved out of engagement with its terminals. Moreover, the various parts are so arranged that even if the magnetic coil of this second switch be energized the blades of said switch cannot be closed until the coil of the first switch has been deënergized and its blade brought to an open position.

The switches D, E, F, and G when considered together constitute the reversing-switch of the motor, and it will be seen that the switches D and G will close simultaneously, since their coils are both connected to a common contact-finger 2 of the controller B. Similarly the switches E and F will close together, since their operating magnet-coils are both connected to the same contact-finger 1. It will be seen, however, that both of these pairs of switches cannot be closed at the same time, since one switch of each pair has extending between its blade and the blade of a switch of the second pair one of the locking-bars Q.

The connections between the switches D to G, inclusive, are such that with the switches D and G closed current will flow through the armature of the motor in one direction, while with the switches E and F closed current will flow through said armature in an opposite direction, the direction of the current in the field-windings remaining unchanged. It will be seen that the shunt field-winding is permanently connected between the positive and negative supply-mains.

The switches O and I serve as main switches to cut off the motor from the supply-mains, it being noted, however, that both the shunt field-winding and the various connections for the magnetic coils of the switches are connected to the live sides of these switches.

Switches J, K, L, and M, respectively, control the four banks of resistance $c$, $c'$, $c^2$, and $c^3$, the connections being such that when the switch J is closed the resistance $c$ is in circuit with the motor, while with the switches J and K closed the two resistances $c$ and $c'$ will be in multiple with each other and together in series with the motor. Similarly the closing of the switches L and M successively throws the resistances $c^2$ and $c^3$ in multiple with the other resistances $c$ and $c'$, with the result that each additional bank of resistance thrown into circuit reduces the combined resistance in circuit with the motor while increasing the carrying capacity of this portion of the circuit.

The switches H and P serve to close the circuit of the motor during the action of braking and are respectively interlocked with the main switches I and O, so that by no possibility can these latter be closed at the same time as are said switches H and P.

The switches F, G, J, K, L, M, O, and P are each provided with auxiliary terminals $f$ $g$, &c., which are electrically connected by suitably-placed metallic pieces $f'$ and $g'$, &c., carried by but insulated from the blades of these switches when said blades are in their closed positions. The functions of these auxiliary switches will be noted in connection with the description of the operation of the system.

Considering the motor at rest, the turning of the barrel of the operating-controller B to the first point, so as to bring the segments $b$ into engagement with the fingers of said controller, will cause the switches E, F, H, J, K, L, M, and P to be closed, there being, however, no flow of current through the main circuit, because the main switches I and O remain open. On the second point it will be seen that there is no longer a segment in engagement with the finger 8 of the controller B, and since this deënergizes the coil of the switch J said switch opens. On the second and third points the circuits including the fingers 6 and 7 are successively open-circuited, thus causing the switches K and L to open, while on the fourth point the fingers 2 and 4 are supplied with current by contact with suitable segments on the controller-barrel, and the coils of switches D and G are consequently energized. Said switches cannot, however, close, since the blades of the switches E and F, through their respective locking-bars Q, prevent motion of the blades of said switches D and G. Similarly, though the coils of switches I and O are energized, switches P and H, being closed, effectually prevent the closing of said main switches. As soon, however, as the continued motion of the barrel of the controller B causes the segments hitherto in engagement with the fingers 1 and 3 to break contact with the same the coils of the switches D, G, H, and P are deënergized, and consequently the four switches E, F, I, and O at once close under the action of their respective coils. Since the switch M has remained closed from the beginning, current will now flow through the motor, passing from the positive supply-main to the switch O, through the bank of resistance $c^3$, switch M, switch G, armature $a$, switch D, coil $a^3$ of the solenoid-brake, series winding $a^2$ of the motor, lower terminal of switch H, and through switch I to the negative supply-main. The passage of current through the coil $a^3$ causes the brake controlled thereby to be released, and consequently the motor will start and operate its attached machinery in the well-known manner.

As the barrel of the controller B is turned to its next point the finger 6 of said controller is again supplied with current and energizes the coil of the switch L. The closing of this latter switch throws the bank of resistance $c^2$ into multiple with the resistance $c^3$, which by reducing the combined resistance in circuit with the motor permits this latter to receive more current and to operate at a higher speed. On succeeding points of the controller the speed of the motor is still further increased by the successive placing of the banks of resistance $c'$ and $c$ in multiple with the resistance previously in circuit until on the last point the finger 9 of the controller B is supplied with current and the coil of the switch N is energized. The closing of this switch short-circuits all of the resistance, so that the motor is supplied with current direct from the mains and will operate at full speed. If now the barrel of the controller B is turned in a reverse direction, the switches N, J, K, and L will successively open, gradually increasing the effective resistance in circuit with the motor and reducing its speed. After the opening of the switch L it will be seen that the fingers 1 and 3 of the controller are again supplied with current, thereby energizing the coils of the switches E and F and H and P. As soon, therefore, as the contact-fingers 2 and 4 no longer engage their respective segments switches D and G and I and O are opened and the switches E, F, H, and P are immediately thereafter closed. Under these conditions it will be seen that the motor is short-circuited upon itself, and since its armature is still turning either under the action of the machinery attached to it or by means of its own momentum current will be generated and will consequently retard such revolution. The path of this current will be from the armature $a$ to the switch E, coil $a^3$, series field $a^2$, switch H, resistance $c^3$, switch M, switch F, and back to the armature.

It will be seen that by causing the switches E, F, H, and P to close immediately after the switches D, G, I, and O have been opened there is practically no cessation of current through the coil $a^3$, so that the solenoid brake mechanism still remains in its released position. The continued motion of the barrel of the controller B toward its off position gradually increases the braking effect upon the motor by reason of the successive closing of the switches L, K, and J, which place the resistance $c$, $c'$, and $c^2$ in multiple with the resistance $c^3$, thus permitting increased current to flow through the circuit. Under these circumstances the armature of the motor is very quickly brought to rest, and since as soon as its motion ceases there is no further flow of current through the coil $a^3$ the brake will be instantly applied, so as to hold the load from further motion. From the above it will be seen that not only the operating speed of the motor, but the retardation exerted by the same in bringing a load to rest, is completely under the control of an operator.

The movement of the barrel of the controller B to the other side of its off position and its return to said off position produces the same cycle of operations as that hitherto described, with the exception that the direction of rotation of the armature is reversed.

It will be noted that among the segments of the controller B there is none for causing the closing of the switch N after the various banks of resistance have been thrown in to increase the braking action of the motor. This is done in order to limit the maximum braking-current which may be generated by the motor.

The various auxiliary switches above noted are so connected that the main switches are interlocked when current is supplied to the motor, said main switches being necessarily closed in the following order in speeding the motor—viz., switches F or G, O, M, L, K, and J—and when the controller B is operated to retard the action of the motor in the following order—viz., switches F or G, P, M, L, K, and J.

I claim as my invention—

1. The combination of a motor, a switch or switches for reversing the direction of current-flow through one of the members of said motor, another switch or switches for closing the circuit of the motor independently of the supply-mains and a controller having fingers and two series of contacts, with connections between the switches and the controller so arranged that the contacts in either series first engaged by the fingers will cause operation of the switches for short-circuiting the motor, substantially as described.

2. The combination of a motor, an electromagnetic switch or switches for connecting the same to supply-mains, another electromagnetic switch or switches for connecting said motor in a closed circuit independent of said mains, with a motor-reversing device connected to operate said supply switch or switches only after the short-circuiting switch or switches have been operated as said device is moved in either direction from its "off" position, and mechanism for keeping open one switch or set of switches as long as the other set is closed, substantially as described.

3. The combination of a motor, switches, and a controller for operating said switches, said controller having contact-fingers and contacts, said contacts being arranged and connected on each side of the fingers so that the switches will be operated to successively brake and accelerate the motor as the controller is operated in either direction from its "off" position, substantially as described.

4. The combination of a motor, a reversing switch or switches, a short-circuiting switch or switches, a bank of resistance, a switch for controlling the introduction of said resistance into circuit with the motor and a controller for operating said switches, said controller having contacts for causing the resistance-controlling switch to close both when the motor is receiving current from the supply-mains and when it is in a closed circuit independent of said mains, substantially as described.

5. The combination of a motor, switches for accelerating, braking and reversing the same, a controller including fingers and a plurality of series of contacts, with connections between said switches and the controller so arranged that the braking-switches are actuated before the accelerating-switches, substantially as described.

6. The combination of a motor, switches for accelerating, braking and reversing the same, a controller including fingers and a plurality of series of contacts, with connections between said switches and the controller so arranged that the braking-switches are actuated before the accelerating-switches, as said controller is operated in either direction from its "off" position, substantially as described.

7. The combination of a motor, a coil having a brake, in circuit therewith, a switch or switches for connecting the motor to supply-mains, a switch or switches for connecting the motor in a closed circut independently of said mains and a controller for actuating said switches, substantially as described.

8. The combination of a compound-wound motor, a coil for a brake in circuit with the series winding thereof and a switch or switches for connecting the motor to supply-mains, a switch or switches for connecting the motor in a closed circuit independently of said mains and a controller for actuating said switches, substantially as described.

9. The combination of a motor with a switch or switches for connecting the same to supply-mains, another switch or switches for connecting the motor in a closed circuit independently of said supply-mains, with a controller for operating said switches, said controller having its contacts so connected as to actuate said switch or switches for connecting the motor in a closed circuit, before the other switches are actuated, as said controller is operated from its "off" position, substantially as described.

10. The combination of a motor with means for governing the flow of current through the same, said means including a controller having fingers and contacts so placed that operation of said controller in either direction from its "off" position first connects said motor in a closed circuit and afterward connects it to the current-supply mains, substantially as described.

11. The combination of a motor with means for governing the flow of current thereto, said means including a controller having fingers and a movable structure actuated from a single movable part, said structure having contacts so placed that operation of said part in either direction from its "off" position first connects said motor in a closed circuit and afterward connects it to current-supply mains, substantially as described.

12. The combination of a motor with means for governing the flow of current thereto, said means including a controller having fingers and contacts so placed that operation of the movable element of the controller in one direction from its "off" position first connects said motor in a closed circuit and afterward connects it to the supply-mains, while operation of the controller in the opposite direction from said "off" position reverses the motor and successively connects it in a closed circuit and to the supply-mains, substantially as described.

13. The combination of a motor, a series of switches for reversing the same, a switch or switches for connecting the motor to supply-mains, another switch or switches for connecting the motor in a circuit independent of said supply-mains, with an interlocking device or devices between the supply-switches and the short-circuiting switches, and between certain of the reversing-switches, substantially as described.

14. The combination of a motor, banks of resistance, switches for throwing the same into circuit, a switch or switches for connecting the motor to supply-mains, a switch or switches for connecting the motor in a closed circuit independent of said mains and a controller for said switches including contacts whereby the resistance-controlling switches are made to operate both when the motor is short-circuited and when it is receiving current from the supply-mains, substantially as described.

15. The combination of a motor, banks of resistance, switches for throwing said resistance into circuit, means for connecting the motor to supply-mains, means for connecting the motor in a closed circuit independent of said means, a switch for short-circuiting said resistance, with a controller for operating said switches, said controller being constructed to actuate the resistance-controlling switches both when the motor is connected to the supply-mains and when it is connected in a circuit independent of said means, the switch for short-circuiting said resistance being operated only when the motor is connected to the supply-mains, substantially as described.

16. The combination of a motor, switches for controlling the operation thereof, with a pivoted bar free to turn in a plane substantially at right angles to the planes of motion of the switch-blades and having its ends respectively operative upon two switch-blades to prevent both of said blades being in a closed position at the same time, substantially as described.

In testimony whereof I have signed my name to this specification in the presence of two subscribing witnesses.

ARTHUR C. EASTWOOD.

Witnesses:
C. W. COMSTOCK,
D. P. BALLARD.